(12) United States Patent
Lee et al.

(10) Patent No.: US 11,587,235 B2
(45) Date of Patent: Feb. 21, 2023

(54) METHOD AND APPARATUS FOR DETECTING DEFECTS ON SUBSTRATE

(71) Applicant: Samsung Electronics Co., Ltd., Suwon-si (KR)

(72) Inventors: Sunghee Lee, Osan-si (KR); Kyubaik Chang, Seoul (KR)

(73) Assignee: Samsung Electronics Co., Ltd.

( * ) Notice: Subject to any disclaimer, the term of this patent is extended or adjusted under 35 U.S.C. 154(b) by 164 days.

(21) Appl. No.: 17/141,770

(22) Filed: Jan. 5, 2021

(65) Prior Publication Data

US 2021/0407099 A1 Dec. 30, 2021

(30) Foreign Application Priority Data

Jun. 29, 2020 (KR) .................. 10-2020-0079050

(51) Int. Cl.
*G06T 7/13* (2017.01)
*G06T 7/00* (2017.01)
(Continued)

(52) U.S. Cl.
CPC .............. *G06T 7/13* (2017.01); *G06T 7/0004* (2013.01); *G06T 7/136* (2017.01); *G06T 7/155* (2017.01);
(Continued)

(58) Field of Classification Search
CPC . G06T 7/136; G06T 2207/30148; G06T 7/10; G06T 7/13; G06T 7/0004–001;
(Continued)

(56) References Cited

U.S. PATENT DOCUMENTS 6,408,105 B1 6/2002 Maruo
6,741,734 B2 5/2004 Sasaki et al.
(Continued)

FOREIGN PATENT DOCUMENTS

JP 4135367 B2 8/2008
JP 4872979 B2 12/2011
(Continued)

OTHER PUBLICATIONS

Canny, John. "A computational approach to edge detection." IEEE Transactions on pattern analysis and machine intelligence 6 (1986): 679-698. (Year: 1986).*

(Continued)

*Primary Examiner* — Geoffrey E Summers
(74) *Attorney, Agent, or Firm* — Myers Bigel, P.A.

(57) ABSTRACT

A method for detecting a defect on a substrate, including receiving a first image, generating a second image, by converting the first image to grayscale levels, calculating a first gray level value, having a maximum number of pixels in the second image, and second and third gray level values, having a number of pixels in the second image equal to a predetermined fraction of the first gray level value, from a histogram of the number of pixels respective to the grayscale levels of the second image, converting the second image into a third image having pixels at a level lower than that of the first gray level value and a fourth image having pixels at a level equal to or higher than the first gray level value, generating fifth and sixth images by detecting edges by applying a Canny algorithm to the third and fourth images, respectively.

20 Claims, 21 Drawing Sheets

(51) Int. Cl.
*G06T 7/136* (2017.01)
*G06T 7/155* (2017.01)

(52) U.S. Cl.
CPC ...... *G06T 7/97* (2017.01); *G06T 2207/10016* (2013.01); *G06T 2207/10061* (2013.01); *G06T 2207/30148* (2013.01)

(58) Field of Classification Search
CPC . G06T 7/155; G06T 7/97; G06T 2207/10016; G06T 2207/10061
See application file for complete search history.

(56) References Cited

U.S. PATENT DOCUMENTS

| | | |
|---|---|---|
| 7,440,605 B2 | 10/2008 | Sasa et al. |
| 7,492,942 B2 | 2/2009 | Ishikawa et al. |
| 7,796,804 B2 | 9/2010 | Bhaskar et al. |
| 8,873,890 B2 | 10/2014 | Kurzweil et al. |
| 9,311,698 B2 | 4/2016 | Chu et al. |
| 10,533,953 B2 | 1/2020 | Jiang et al. |
| 2001/0028733 A1* | 10/2001 | Sasaki ............... G01N 21/956 382/149 |
| 2013/0188859 A1* | 7/2013 | Luo .................. G06T 7/143 382/149 |
| 2014/0328534 A1 | 11/2014 | Lin et al. |
| 2020/0292463 A1 | 9/2020 | Kang et al. |

FOREIGN PATENT DOCUMENTS

| | | |
|---|---|---|
| KR | 101677070 B1 | 11/2016 |
| KR | 20200014438 A | 2/2020 |

OTHER PUBLICATIONS

Jie, Gao, and Liu Ning. "An improved adaptive threshold canny edge detection algorithm." 2012 International Conference on Computer Science and Electronics Engineering. vol. 1. IEEE, 2012. (Year: 2012).*

Wang, Yupeng, and Jiangyun Li. "An improved Canny algorithm with adaptive threshold selection." MATEC Web of Conferences. vol. 22. EDP Sciences, 2015. (Year: 2015).*

* cited by examiner

METHOD AND APPARATUS FOR DETECTING DEFECTS ON SUBSTRATE

CROSS-REFERENCE TO RELATED APPLICATION(S)

This application claims benefit of priority to Korean Patent Application No. 10-2020-0079050 filed on Jun. 29, 2020, in the Korean Intellectual Property Office, the disclosure of which is incorporated herein by reference in its entirety.

BACKGROUND

1. Field

The present disclosure relates to a method and an apparatus for detecting defects on a substrate.

2. Description of Related Art

As a manufacturing process of a substrate for producing a semiconductor chip involves a plurality of processes, which are carried out sequentially, a defect, upon occurrence thereof in any one of the processes, remains on the substrate until the last process, resulting in a defective substrate. In this regard, it is important to find a substrate on which a defect has occurred and remove the defect so as to improve productivity. To rapidly find the defect on the substrate, there is an increasing demand for improvement of display accuracy of a defect area.

SUMMARY

An aspect of the present disclosure is to provide a method and an apparatus for detecting defects on a substrate for improving display accuracy of a defect area occurred in a substrate manufacturing process.

According to an aspect of the present disclosure, a method for detecting a defect on a substrate includes receiving a first image of a subject that is generated by a measuring apparatus, generating a second image, by converting the first image to grayscale levels, calculating a first gray level value, having a maximum number of pixels in the second image, and second and third gray level values, having a number of pixels in the second image equal to a predetermined fraction of the first gray level value, from a histogram of the number of pixels respective to the grayscale levels of the second image, converting the second image into a third image having pixels at a level lower than that of the first gray level value and converting the second image into a fourth image having pixels at a level equal to or higher than the first gray level value, generating fifth and sixth images by detecting edges by applying a Canny algorithm to the third and fourth images, respectively, and overlapping the edges that are detected with the third and fourth images, where the second and third gray level values are applied as respect low thresholds, and overlapping and outputting the fifth and sixth images.

According to an aspect of the present disclosure, a method for detecting a defect on a substrate includes obtaining a grayscale image, calculating a first gray level value corresponding to a maximum pixel number, and second and third gray level values that are a predetermined fraction of a maximum value associated with the maximum pixel number, from a histogram of the grayscale image, generating a first image having a gray level lower than the first gray level value and a second image having a gray level equal to or higher than the first gray level value by converting the grayscale image, and detecting edges by applying an edge detecting algorithm to the first and second images, where the second and third gray level values are applied as low and high thresholds of the edge detecting algorithm, respectively.

According to an aspect of the present disclosure, an apparatus for detecting a defect on a substrate includes a measuring apparatus configured to image a subject to generate a first image, and an image processing unit configured to perform operations including receiving the first image of the subject generated by the measuring apparatus, generating a second image, by converting the first image to grayscale levels, calculating a first gray level value, having a maximum number of pixels in the second image, and second and third gray level values, having a number of pixels in the second image equal to a predetermined fraction of the first gray level value, from a histogram of the number of pixels respective to the grayscale levels of the second image, converting the second image into a third image having pixels at a level lower than that of the first gray level value and converting the second image into a fourth image having pixels at a level equal to or higher than the first gray level value, generating fifth and sixth images by detecting edges by applying a Canny algorithm to the third and fourth images, respectively, and overlapping the edges that are detected with the third and fourth images, where the second and third gray level values are applied as respective low thresholds, and overlapping and outputting the fifth and sixth images.

DETAILED DESCRIPTION

Hereinbelow, various embodiments will be described in detail with reference to the accompanying drawings.

Figure 1:
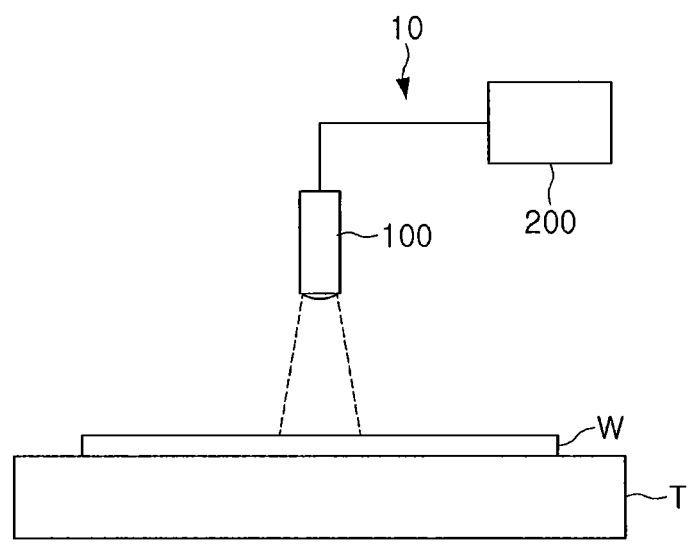
FIG. 1 is a diagram schematically illustrating an apparatus for detecting a defect on a substrate, according to an example embodiment of the present disclosure.

FIG. 1 is a diagram schematically illustrating an apparatus for detecting a defect on a substrate, according to an example embodiment of the present disclosure. Referring to FIG. 1, an apparatus 10 for detecting a defect on a substrate according to an example embodiment of the present disclosure may include a measuring apparatus 100 generating an image by imaging a surface of the substrate W from above the substrate W, and an image processing unit 200 detecting and outputting a defect area of the substrate W by image processing an image delivered from the measuring apparatus 100. In an example embodiment, the substrate W may be a wafer and may be provided in a state of being seated on a support, such as a chuck table T. Further, in an example embodiment, a case in which the defect detecting apparatus 10 captures an image of the substrate W, which has undergone chemical mechanical polishing (CMP), and detects a defect area, is described. However, the present disclosure is not limited thereto. The defect detecting apparatus 10 according to an example embodiment may be applied to various processes of a substrate manufacturing process, such as the case in which a mask is formed on the substrate W and a defect area is detected on a surface of the mask.

Figure 2:
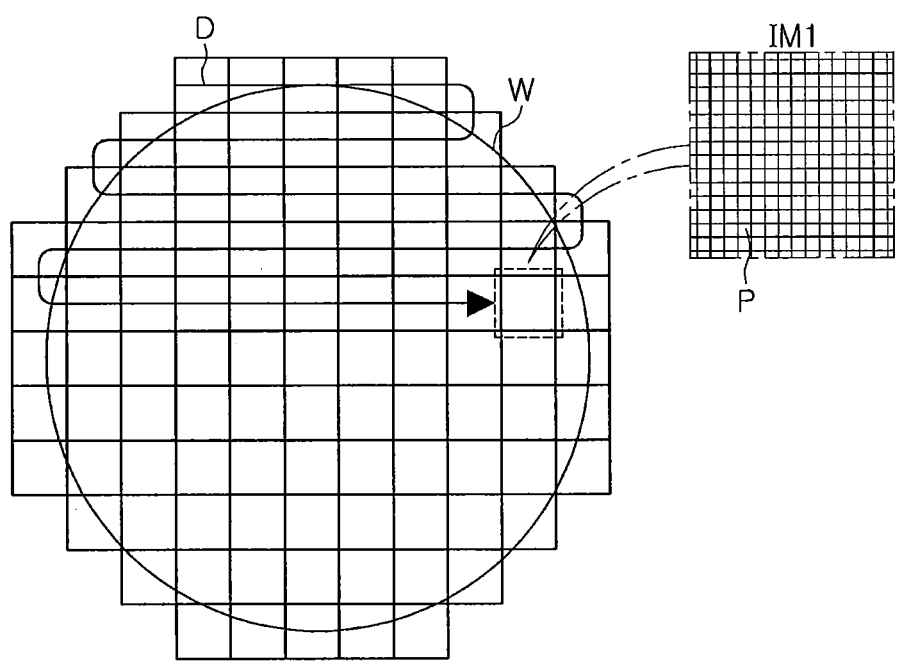
FIG. 2 is a diagram illustrating a process in which an image processing unit of FIG. 1 scans a surface of a substrate for imaging thereof.

The measuring apparatus 100 may be an electron microscope used in monitoring a manufacturing process of the substrate W. The electron microscope may be any one of a critical dimension scanning electron microscopy (CD-SEM), a cross-sectional SEM and a transmission electron microscope (TEM), or the like. FIG. 2 is a diagram illustrating a process in which an image processing unit of FIG. 1 scans a surface of a substrate for imaging thereof. As illustrated in FIG. 2, the measuring apparatus 100 scans the entire substrate W while moving in one direction D and may sequentially capture an image of each region of the substrate W. The measuring apparatus 100 may generate a plurality images IM1 corresponding to each of the image-captured regions. A plurality of the images IM1 may respectively include a plurality of predetermined pixels (e.g., 2048×2000 (P)). According to example embodiments, each captured image may be a color image or a gray image.

The image processing unit 200 may be configured to display-process a plurality of the images delivered from the measuring apparatus 100 and detect a defect area in the image and indicate the detected defect area with a highly visible color to output such that a user can easily recognize the same. In an example embodiment, the image processing unit 200 may be implemented as a personal computer (PC) and may output an image, in which a defect area of the substrate W is indicated, to a monitor.

Figure 3:
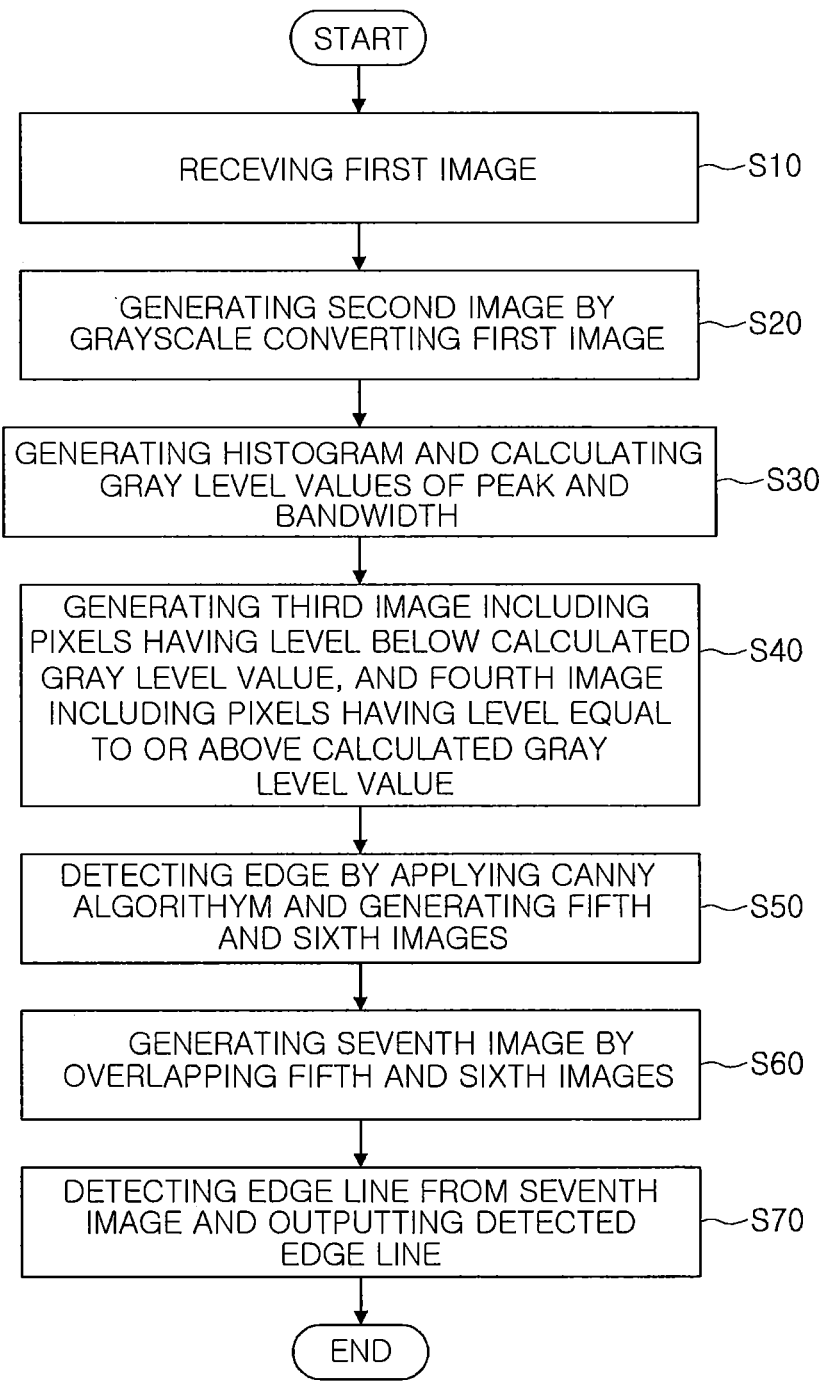
FIG. 3 is a flowchart illustrating a method for detecting a defect on a substrate using the defect-detecting apparatus according to an example embodiment of the present disclosure.

A method for detecting a defect area of an image by the image processing unit 200 will be described with reference to FIG. 3. Conventionally, a method of detecting a defect area may include comparing a captured image with a reference image of a normal substrate to detect a defect area in the captured image of a substrate. Such a method, however, necessarily requires a reference image and thus has a problem in that a new reference image needs to be prepared for a changed production process. In contrast, the apparatus for detecting a defect on a substrate according to an example embodiment of the present disclosure facilitate detection of a defect area using a captured image only, without a reference image.

Figure 10A:
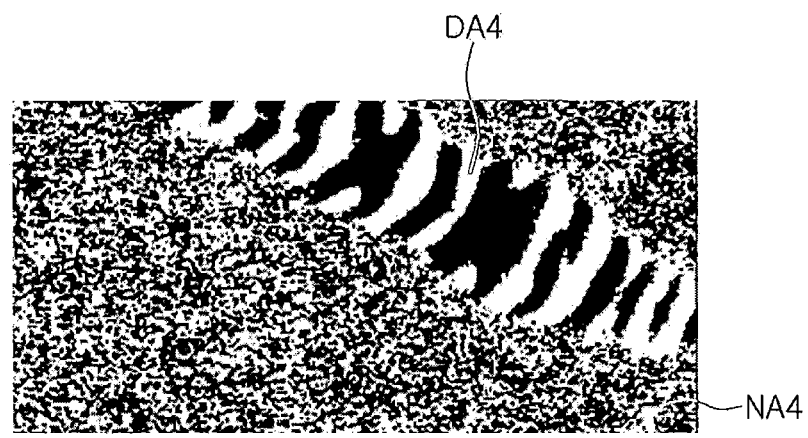
FIG. 10A is an image illustrating a comparative example applied with a binary function to the second image.
Figure 10B:
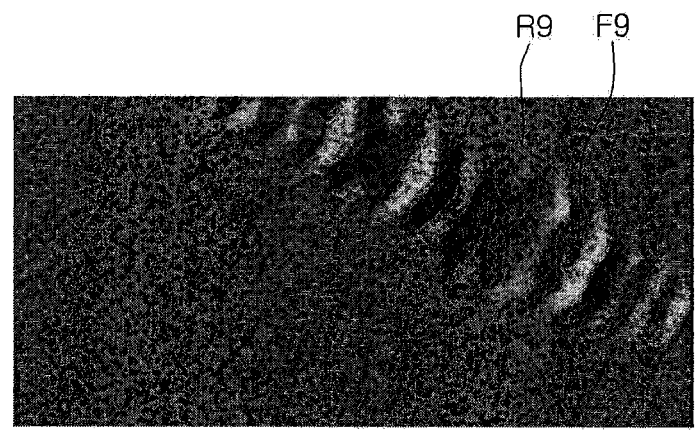
FIG. 10B is an image of the edge detected and overlapped in the image of FIG. 10A.

Further, to detect a defect area only using a captured image of a substrate, a method of binary-processing the captured image and detecting an edge using the binary-processed image was previously used, which accompanied a problem that the defect area is significantly inaccurately detected depending on a captured image. This will be described with reference to FIGS. 10A and 10B, FIG. 10A is an image illustrating a comparative example applied with a binary function to the captured image, and FIG. 10B is an image of the edge detected and overlapped in the image of FIG. 10A. A binary function involves converting an input value that is lower than a reference value into 0 and converting an input value that is equal to or higher than the reference value into a maximum value. In this regard, a grayscale image as in FIG. 10A is generated when a binary function is applied to the captured image. Accordingly, it can be seen that black and white pixels of the same level are mixed in the defect area DA4 and a normal area NA4.

In the case of detecting an edge in such an image, an entire image may be detected as an edge region and indicated as a defect area or may be detected as having no edge and thus no defect area, depending on a value input as a threshold. FIG. 10B is an image indicating the defect area F9 and the detected defect area marked as R9 and shows the entire image marked as the defect area. In this regard, in the case of applying a binary function to the captured image and detecting an edge, there may be a problem in that the defect area of the substrate W may not be indicated accurately. This leads to an increased amount of time for determining a defect of the substrate and increased production costs. The apparatus for detecting a defect on a substrate according to an example embodiment may indicate a defect area with high accuracy while indicating the defect area using the captured image only. A method of detecting a defect area of an image by the image processing unit 200 of the defect detecting apparatus 10 according to an example embodiment will be described in detail with respect to FIG. 3.

Figure 4A:
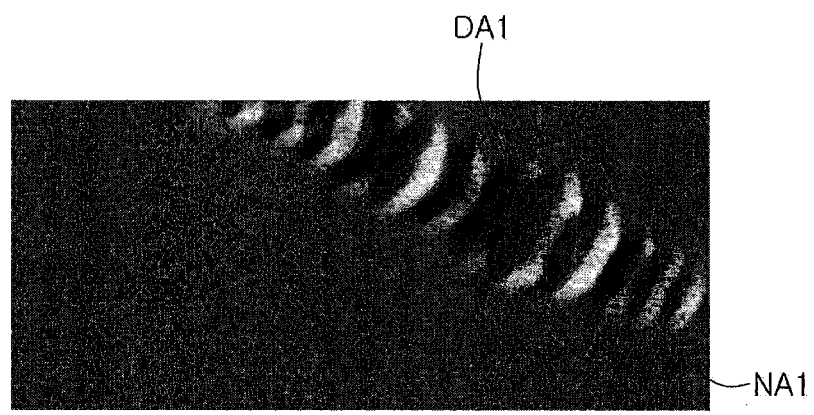
FIG. 4A is an optical image captured by a measuring apparatus.

First, the image processing unit 200 may receive a captured image (hereinafter, "first image") from the measuring device 100 (S10). The first image may be a colored image; however, according to example embodiments, the colored image may be grayscale-converted to be a gray image. When the received first image is a colored image, the image processing unit 200 may convert the first image into a gray image (hereinafter, "second image") (S20) followed by performing subsequent processes. FIG. 4A illustrates an example of the second image generated by gray-converting the colored image captured in the image processing unit 200. In the image of FIG. 4A, an area in which a defect has occurred (hereinafter, "defect area"; DA1) is observed together with a normal area NA1.

According to example embodiments, the image processing unit 200 may resize the first image or blur the first image before converting the first image into the second image. The blurring may be performed by applying a function such as a Gaussian filter or a median filter.

The image processing unit 200 may draw a histogram in which a number of pixels are calculated in accordance with a gray level of the second image and detect a gray level value (hereinafter, "first gray level value"), a point at which a number of pixels are maximum in the histogram (e.g., a peak), and gray level values (hereinafter, "second and third gray level values") corresponding to a bandwidth (S30).

Figure 4B:
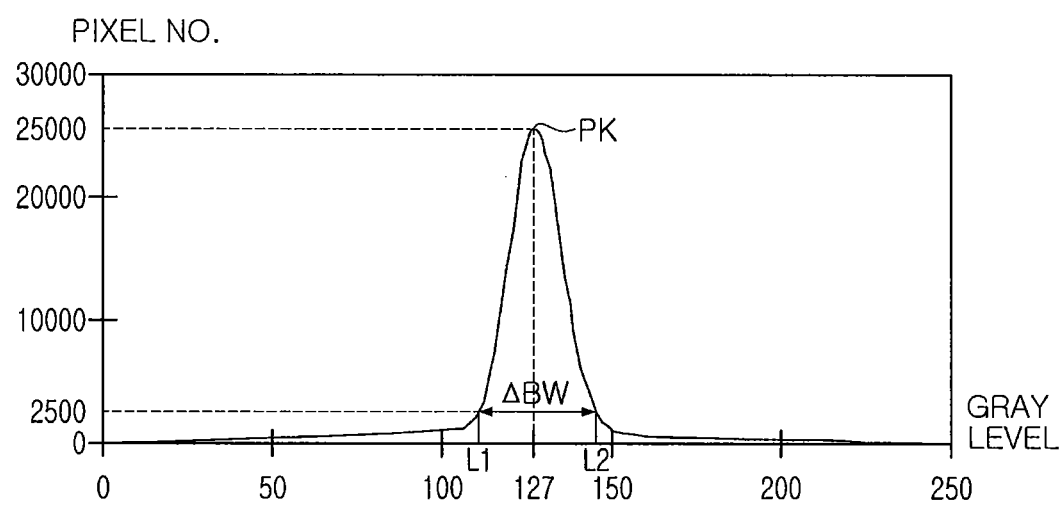
FIG. 4B is a histogram of the optical image of FIG. 4A, according to an example embodiment of the present disclosure.

As the second image is a gray image, a histogram of the second image may have one peak PK and show a single-peak distribution having a narrow bandwidth ΔBW based on a peak value as in FIG. 4B. FIG. 4B illustrates a case in which a peak PK having a number of pixels of 25,000 at a gray level of 127. A peak of pixel number detected at the gray level of 127 in the histogram of the second image means that a number of pixels having a gray level value of 127 is the highest. In a conventional substrate-processing process, a defect generated on a surface of the substrate W is generated in a relatively small area, as compared to an entire surface area of the substrate. In this regard, a normal area NA1, in which no defects have occurred, are observed in most of the captured image region, and the normal area NA1 may be indicated as a gray level having a highest number of pixels in the histogram of the second image. However, pixels having the same level value as the normal area NA1 may be included in the defect area DA1, and those having a level other than the first gray level value may be included in the normal area DA1. Accordingly, an area indicated by the pixel at the level at which a peak is detected cannot be simply considered as the normal area NA1. In this regard, the defect area DA1 may need to be extracted from the normal area NA1. Subsequently, a treatment for extracting the defect area is carried out.

In some embodiments, the image processing unit 200 may calculate gray level values L1 and L2 at two points in which pixel numbers are 1/10 of the peak PK in the histogram of the second image and define a difference between the gray level values L1 and L2 as a bandwidth ΔBW. Hereinbelow, L1 and L2 are defined as second and third gray level values. As the histogram of the second image shows a distribution symmetrical with respect to the peak value, the point at which a maximum value of the pixel is 1/10 may be symmetrically positioned on both sides of the first gray level value. The second and third gray level values L1 and L2 may be used as low thresholds in subsequent processes of detecting an edge of the defect area, which will be described later. Though the gray level values are described as being 1/10 of the peak PK of the histogram, it will be understood that other predetermined fractions may be used.

The image processing unit 200 may apply first and second activation functions to the second image to generate a third image including pixels having a level below the first gray level value and a fourth image including pixels having a level equal to or higher than the first gray level value (S40). The third and fourth images are images generated by applying different activation functions and thus have different gradations.

As the activation functions, two rectified linear unit (ReLU) functions, defined by Formula 1 and Formula 2 below, may be applied. GV1 refers to the first gray level value.

$$f(x)=0 \text{ for } x<GV1$$

$$f(x)=x \text{ for } x \geq GV1 \quad \text{[Formula 1]}$$

$$f(x)=x \text{ for } x<GV1$$

$$f(x)=0 \text{ for } x \geq GV1 \quad \text{[Formula 2]}$$

Figure 5A:
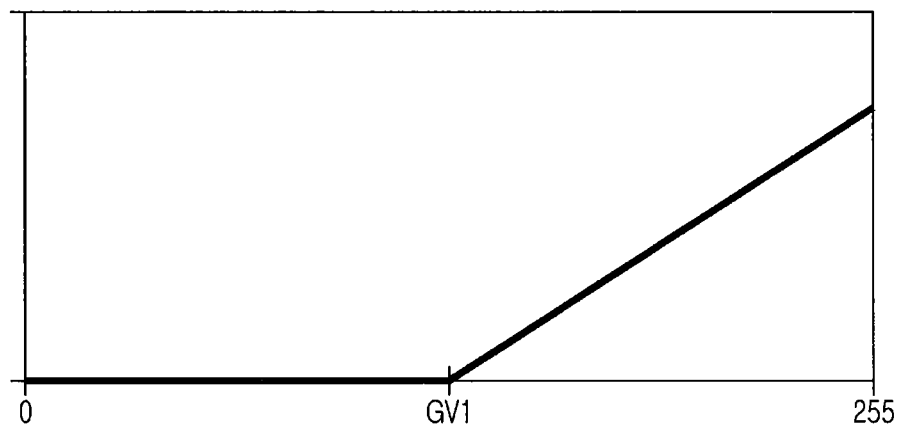
FIG. 5A is a graph illustrating a first activation function, according to an example embodiment of the present disclosure.
Figure 5B:
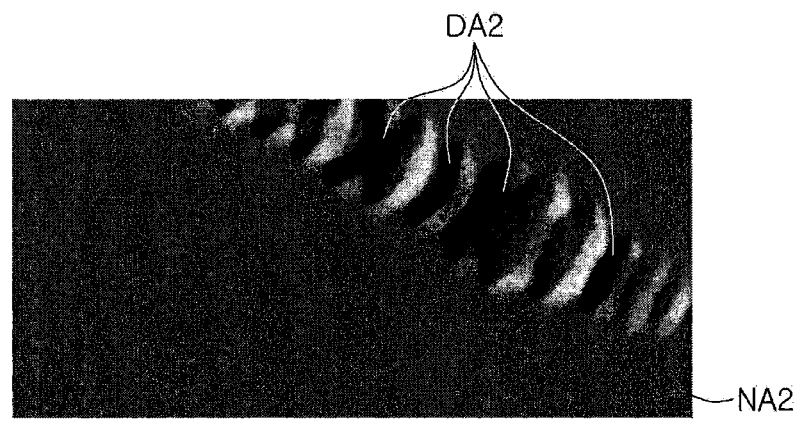
FIG. 5B is an image applied with a first activation function, according to an example embodiment of the present disclosure.
Figure 5C:
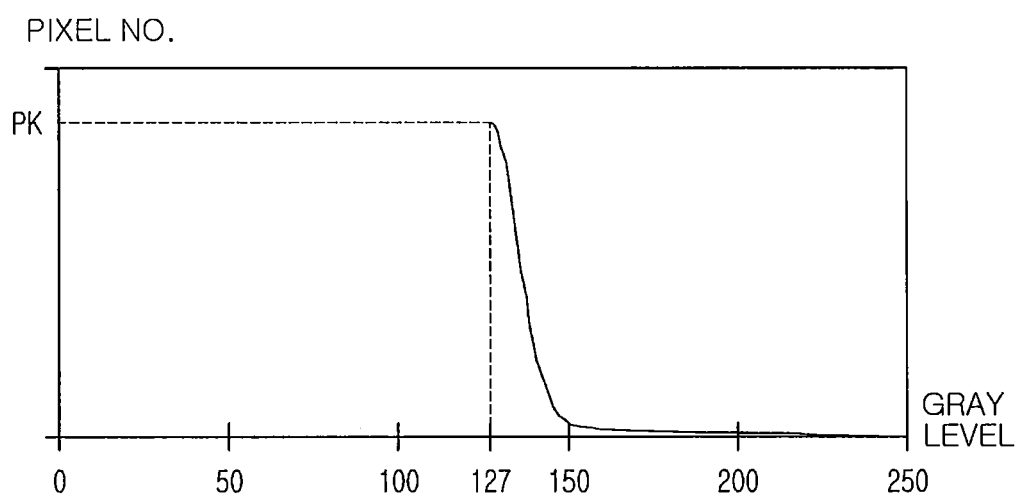
FIG. 5C is a histogram of the image of FIG. 5B.
Figure 6A:
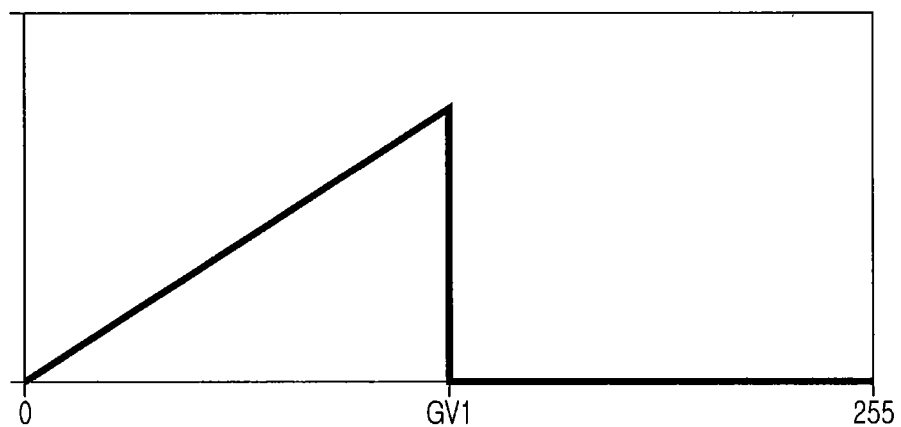
FIG. 6A is a graph illustrating a second activation function, according to an example embodiment of the present disclosure.
Figure 6B:
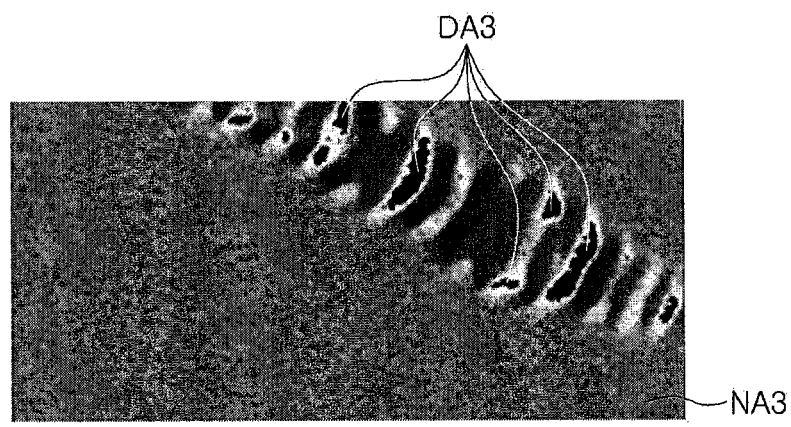
FIG. 6B is an image applied with a second activation function, according to an example embodiment of the present disclosure.
Figure 6C:
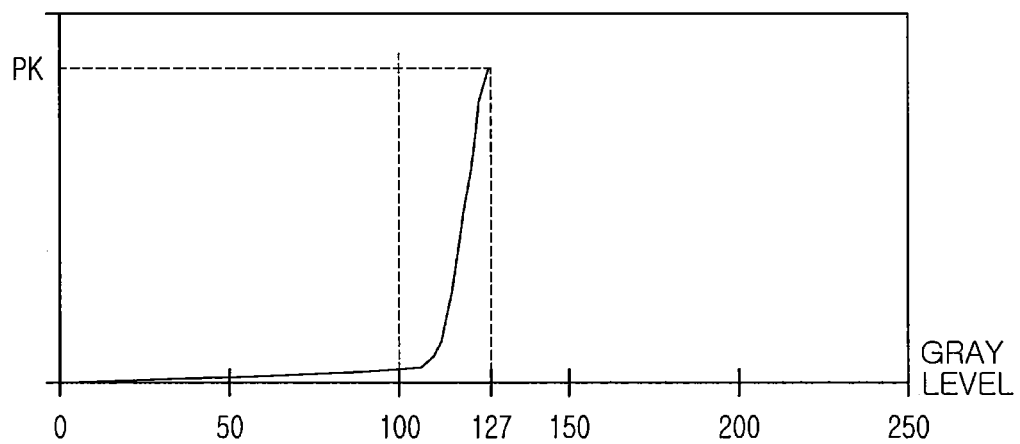
FIG. 6C is a histogram of the image of FIG. 6B.

FIGS. 5A and 6A illustrate the first and second activation functions according to Formula 1 and Formula 2, respectively, FIGS. 5B and 6B are images applied with the first and second activation functions, respectively, and FIGS. 5C and 6C are histograms of images to which the first and second activation functions are respectively applied to the second image, where the first gray level value GV1 is 127.

Upon application of Formula 1 to the second image, the third image is generated as shown in FIG. 5B, while the fourth image is generated as shown in FIG. 6B upon application of Formula 2 to the second image.

In Formula 1, a value lower than the first gray level value GV1 is processed as 0. In this regard, a value positioned on the right of the first gray level value GV1 and the value having a gray level of 0 remain in the histogram of FIG. 5B, as shown in FIG. 5C. Accordingly, it can be understood that the third image (FIG. 5B) is converted such that dark pixels at a level below the first gray level in the second image (FIG. 4A) are expressed even darker. That is, the third image (FIG. 5B) shows a darker portion of the defect area DA2 is converted to be darker overall, thereby increasing a difference in gray levels of the dark portions of the normal area NA2 and the defect area DA2, as compared to the second image (FIG. 4A).

Meanwhile, a value equal to or higher than the first gray level value GV1 is processed as 0 in Formula 2. In this regard, a value positioned on the left of the first gray level value GV1 and the value having a gray level of 0 remain in the histogram of FIG. 6B, as shown in FIG. 6C. Accordingly, it can be understood that the fourth image (FIG. 6B) is converted such that bright pixels at a level equal to or higher than the first gray level in the second image (FIG. 4A) are expressed dark. A bright region of the defect area, brightly expressed in the second image (FIG. 4A), is expressed dark in the fourth image (FIG. 6B). That is, the fourth image (FIG. 6B) shows a bright portion of a defect area DA3 is converted to be dark, thereby decreasing a difference in gray levels of the bright portion of the normal area NA3 and the dark portion of the defect area DA3. Further, due to a border region which has not been converted to be dark, the bright portion of the defect area in the second image (FIG. 4A) is converted to be dark and thus is clearly noticeable A Canny algorithm is applied to the third and fourth images to detect an edge, and each edge is overlapped with the third and fourth images to generate fifth and sixth images (S50). The generated fifth and sixth images are overlapped to generate a single image (seventh image) in which an edge of the defect area is detected (S60). As used herein overlapping a first element with a second element means placing the first element on the second element such that a at least one vertical line intersects both the first and second element.

The Canny algorithm involves determining an edge using a low threshold and a high threshold as threshold values. Specifically, the Canny algorithm determines that values lower than the low threshold are not edges and those larger than the high threshold are edges, and that values between the low and high thresholds are definitely edges only when the values are definitely connected to the edges.

In an example embodiment, two different low thresholds are applied when edges of the third and fourth images are determined such that edges of the defect area can be detected in the third and fourth images. The image processing unit 200 may overlap the detected edges to the third and fourth images to generate fifth and sixth images. As for the third image, the second gray level value is applied as the low threshold, and as for the fourth image, the third gray level value is applied as the low threshold.

As previously described, a defect area, which has not conventionally been able to be detected, can be detected by detecting an edge by applying different low thresholds to the third image and the fourth image.

Figure 7:
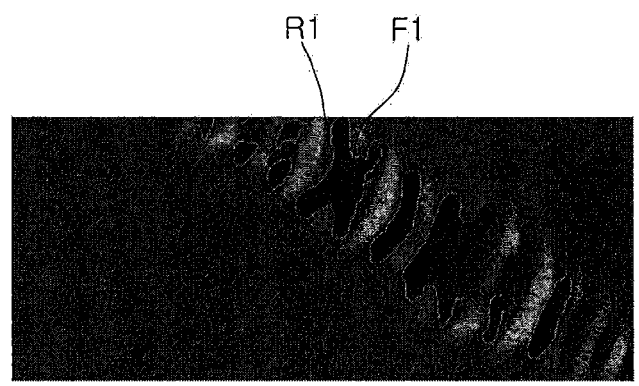
FIG. 7 is an image illustrating detecting an edge by applying a first low threshold to the image of FIG. 5B and overlapping the same.

FIG. 7 illustrates an example of a fifth image generated by applying the second gray level value to the third image as a low threshold to detect an edge and overlapping the detected edge with the third image, according to an example embodiment of the present disclosure. A portion marked as R1 refers to a portion detected as an edge by Canny algorithm. An edge of a dark portion of a defect area (F1) is observed.

Figure 8:
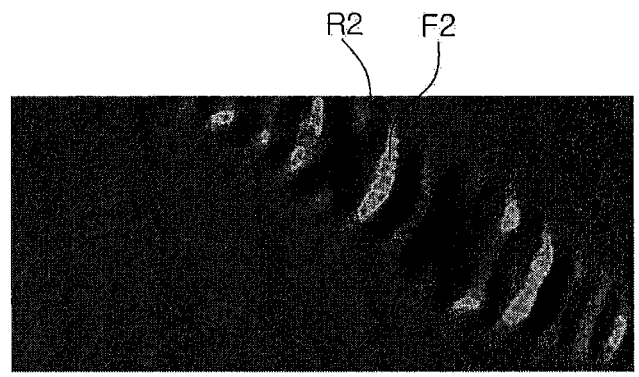
FIG. 8 is an image illustrating detecting an edge by applying a second low threshold to the image of FIG. 6B and overlapping the same.

FIG. 8 illustrates an example of a sixth image generated by applying the third gray level value to the fourth image as a low threshold to detect an edge and overlapping the detected edge with the fourth image, according to an example embodiment of the present disclosure. In FIG. 8, a part marked as R2 refers to a portion detected as an edge by Canny algorithm. A border of a bright portion of a defect area (F2) is detected as an edge.

When the fifth and sixth images, in which edges are indicated, are overlapped, a seventh image (FIG. 9A), in which a dark portion and a bright portion of a defect area (F3) are indicated as edges, may be obtained. Further, according to example embodiments, a process of detecting an edge line, a straight line connecting the edges by applying a Hough algorithm to the seventh image to detect may further be included.

As in the above description, the dark portion and the bright portion of the defect area may be detected as edges when the second and third gray level values are used as low thresholds of Canny algorithm, which will be described with reference to FIGS. 9A to 9F. As shown in Table 1, regions detected as an edge by varying low thresholds (in the "Third Image" column and the 'Fourth Image' column) while fixing high thresholds are indicated. In the drawings, the edges detected by Canny algorithm are indicated by a reference designator beginning with 'R' (e.g., R3, R4, etc.).

TABLE 1

Figure 9A:
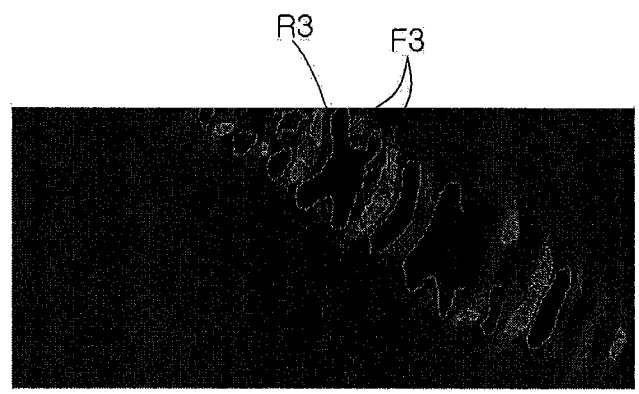
FIGS. 9A to 9F are images of edges detected as the low threshold changes.
Figure 9B:
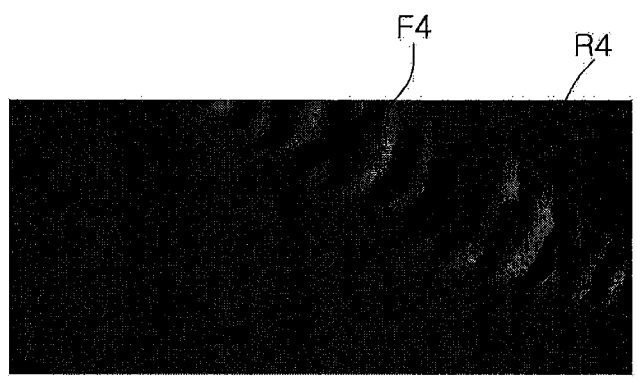
Figure 9C:
Figure 9D:
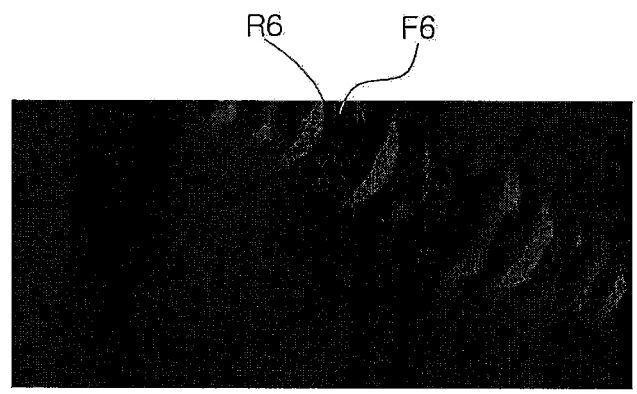
Figure 9E:
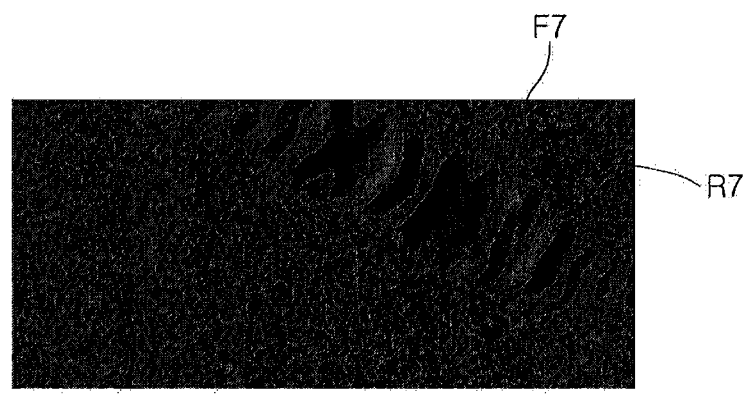
Figure 9F:
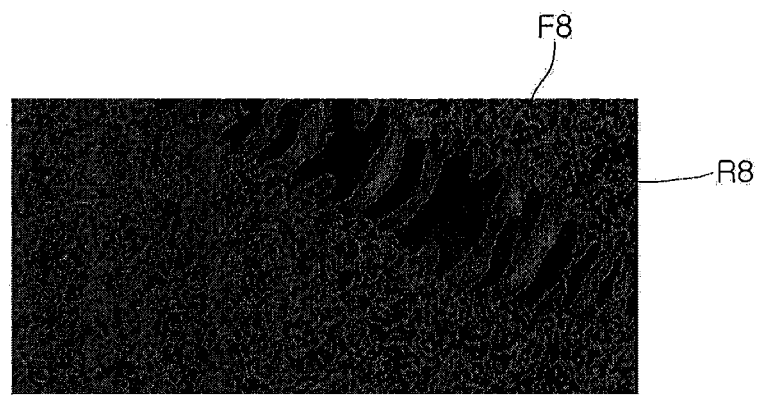

|  | Third image | Fourth image |  |
|---|---|---|---|
| Low threshold | 10 | 250 | FIG. 9B |
|  | 40 | 220 | FIG. 9C |
|  | 70 | 190 | FIG. 9D |
|  | 100 | 160 | FIG. 9A |
|  | 120 | 140 | FIG. 9E |
|  | 130 | 130 | FIG. 9F |
| High threshold | 255 | 255 |  |

In the case of FIG. 9A, an edge of the defect area F3 is clearly indicated, while, in the case of FIG. 9B to 9D, the edge of defect areas F4 to F6 are indicated as significantly small as to be almost invisible. In addition, in FIGS. 9E and 9F, non-edge areas F7 and F8 are indicated as the edges of the defect area, thereby making it difficult to determine whether the defect area exists. As previously described, application of low thresholds as the second and third gray levels when the Canny algorithm is applied to determine the edges of the third and fourth images will facilitate more effective indication of the edges of the defect areas, as compared to the case in which the other values are applied as the low threshold.

As set forth above, a method and an apparatus for detecting a defect on a substrate can be provided, the method and apparatus for improving display accuracy of a defect area occurred during a substrate manufacturing process by optimizing and/or manipulating a reference value of an activation function applied to an image through histogram analysis of an image and optimizing and/or manipulating a threshold of edge detection.

Various advantages and beneficial effects of the present disclosure are not limited to the above descriptions and may be easily understood in the course of describing a specific example embodiment.

While example embodiments have been shown and described above, it will be apparent to those skilled in the art that modifications and variations may be made without departing from the scope of the present disclosure as defined by the appended claims.

What is claimed is:

1. A method for detecting a defect on a substrate, comprising:
receiving a first image of a subject that is generated by a measuring apparatus;
generating a second image, by converting the first image to grayscale levels;
calculating a first gray level value, having a maximum number of pixels in the second image, and second and third gray level values, having a number of pixels in the second image equal to a predetermined fraction of the first gray level value, from a histogram of the number of pixels respective to the grayscale levels of the second image;
converting the second image into a third image comprising pixels at a level lower than that of the first gray level value and converting the second image into a fourth image comprising pixels at a level equal to or higher than the first gray level value;
generating fifth and sixth images by detecting edges by applying a Canny algorithm to the third and fourth images, respectively, and overlapping the edges that are detected with the third and fourth images, wherein second and third gray level values are applied as respective low thresholds; and
overlapping and outputting the fifth and sixth images.

2. The method of claim 1, wherein converting the second image into the third and fourth images comprises applying first and second activation functions to the second image.

3. The method of claim 2, wherein the first and second activation functions respectively comprise a rectified linear unit (ReLU) function.

4. The method of claim 3, wherein the first and second activation functions have the first gray level value as a threshold and satisfy Formula 1 and Formula 2 below:

$$f(x)=0 \text{ for } x<GV1, f(x)=x \text{ for } x \geq GV1 \quad \text{(Formula 1)}$$

$$f(x)=x \text{ for } x<GV1, f(x)=0 \text{ for } x \geq GV1, \quad \text{(Formula 2)}$$

where GV1 is the first gray level value.

5. The method of claim 1, further comprising blurring the first image before generating the second image.

6. The method of claim 5, wherein blurring the first image comprises applying a Gaussian filter to the first image.

7. The method of claim 1, wherein:
the subject is a wafer, and
the measuring apparatus is configured to scan a surface of the wafer.

8. The method of claim 1, wherein the predetermined fraction is $1/10$.

9. A method for detecting a defect on a substrate; comprising:
obtaining a grayscale image;
calculating a first gray level value corresponding to a maximum pixel number, and second and third gray level values that are a predetermined fraction of a maximum value associated with the maximum pixel number, from a histogram of the grayscale image;

generating a first image having a gray level lower than the first gray level value and a second image having a gray level equal to or higher than the first gray level value by converting the grayscale image; and detecting edges by applying an edge detecting algorithm to the first and second images, wherein the second and third gray level values are applied as low and high thresholds of the edge detecting algorithm, respectively.

10. The method of claim 9, wherein:
the grayscale image comprises a plurality of pixels,
the first image includes pixels having a level value below the first gray level value among the plurality of the pixels,
the second image includes pixels having a level value equal to or higher than the first gray level value among the plurality of the pixels.

11. The method of claim 9, wherein the third gray level value is larger than the second gray level value.

12. The method of claim 9, wherein the second and third gray level values in the histogram are symmetrically arranged with reference to the first gray level value.

13. The method of claim 9, wherein the edge detecting algorithm is a Canny algorithm.

14. The method of claim 9, further comprising detecting straight lines connecting the edges by applying a Hough algorithm after detecting the edges.

15. The method of claim 9, further comprising generating third and fourth images by overlapping the edges detected in the first and second images with the first and second images.

16. An apparatus for detecting a defect on a substrate; comprising:
a measuring apparatus configured to image a subject to generate a first image; and
an image processing unit configured to perform operations comprising:
receiving the first image of the subject generated by the measuring apparatus;
generating a second image by converting the first image to grayscale levels;
calculating a first gray level value, having a maximum number of pixels in the second image, and second and third gray level values, having a number of pixels in the second image equal to a predetermined fraction of the first gray level value, from a histogram of the number of pixels respective to the grayscale levels of the second image;
converting the second image into a third image comprising pixels at a level lower than that of the first gray level value and converting the second image into a fourth image comprising pixels at a level equal to or higher than the first gray level value;
generating fifth and sixth images by detecting edges by applying a Canny algorithm to the third and fourth images, respectively, and overlapping the edges that are detected with the third and fourth images, wherein the second and third gray level values are applied as respective low thresholds; and
overlapping and outputting the fifth and sixth images.

17. The apparatus of claim 16, wherein the image processing unit is configured to generate the third and fourth images by applying different first and second activation functions to the second image.

18. The apparatus of claim 17, wherein the fifth and sixth images are overlapped to generate a seventh image in which the defect on the substrate is indicated.

19. The apparatus of claim 16, wherein the measuring apparatus comprises an electron microscope, and
wherein the electron microscope is a critical dimension scanning electron microscope (CD-SEM), a cross-sectional SEM, or a transmission electron microscope (TEM).

20. The apparatus of claim 16, wherein:
the subject is a wafer, and
the measuring apparatus is configured to scan a surface of the wafer.

* * * * *